United States Patent
Lalgudi et al.

(10) Patent No.: US 9,394,444 B2
(45) Date of Patent: Jul. 19, 2016

(54) METHODS OF MODIFYING AGRICULTURAL CO-PRODUCTS AND PRODUCTS MADE THEREFROM

(71) Applicant: Battelle Memorial Institute, Columbus, OH (US)

(72) Inventors: Ramanathan S. Lalgudi, Westerville, OH (US); Barry L. McGraw, Westerville, OH (US); Robert J. Cain, Lewis Center, OH (US)

(73) Assignee: Battelle Memorial Institute, Columbus, OH (US)

( * ) Notice: Subject to any disclaimer, the term of this patent is extended or adjusted under 35 U.S.C. 154(b) by 4 days.

(21) Appl. No.: 14/257,590

(22) Filed: Apr. 21, 2014

(65) Prior Publication Data

US 2014/0228485 A1    Aug. 14, 2014

Related U.S. Application Data

(63) Continuation-in-part of application No. 13/386,150, filed as application No. PCT/US2010/042567 on Jul. 20, 2010, now abandoned.

(60) Provisional application No. 61/226,904, filed on Jul. 20, 2009, provisional application No. 61/227,998, filed on Jul. 23, 2009, provisional application No. 61/245,695, filed on Sep. 25, 2009.

(51) Int. Cl.
| | |
|---|---|
| *C08L 89/00* | (2006.01) |
| *C08F 8/00* | (2006.01) |
| *C08H 1/00* | (2006.01) |
| *C08L 23/02* | (2006.01) |
| *C08J 3/20* | (2006.01) |
| C08L 23/12 | (2006.01) |

(52) U.S. Cl.
CPC . *C08L 89/00* (2013.01); *C08F 8/00* (2013.01); *C08H 1/00* (2013.01); *C08J 3/201* (2013.01); *C08L 23/02* (2013.01); *C08F 2810/50* (2013.01); *C08J 2323/06* (2013.01); *C08J 2323/12* (2013.01); *C08L 23/12* (2013.01)

(58) Field of Classification Search
CPC ............. C08L 89/00; C08J 3/201; C08H 1/00
See application file for complete search history.

(56) References Cited

U.S. PATENT DOCUMENTS

| 4,882,112 A | 11/1989 | Maki et al. |
|---|---|---|
| 5,593,625 A | 1/1997 | Riebel et al. |
| 7,576,147 B2 | 8/2009 | Drzal et al. |
| 2003/0078323 A1 | 4/2003 | Zhang et al. |
| 2004/0151805 A1* | 8/2004 | Gao .................. A23J 3/16 426/46 |
| 2006/0043629 A1 | 3/2006 | Drzal et al. |
| 2006/0147582 A1 | 7/2006 | Riebel |
| 2006/0173105 A1 | 8/2006 | Griffin et al. |
| 2007/0105984 A1 | 5/2007 | Griffin |
| 2007/0167540 A1 | 7/2007 | Vijayendran et al. |
| 2008/0004376 A1 | 1/2008 | Jong |
| 2008/0161450 A1 | 7/2008 | Bartnick et al. |
| 2008/0161502 A1 | 7/2008 | Bartnick et al. |
| 2008/0287571 A1 | 11/2008 | Lundquist et al. |
| 2009/0169867 A1* | 7/2009 | Kelly ............... C08L 89/00 428/326 |

FOREIGN PATENT DOCUMENTS

| WO | 0021743 A1 | 4/2000 |
|---|---|---|
| WO | 2004044045 A2 | 5/2004 |
| WO | 2006020998 A2 | 2/2006 |
| WO | 2006047651 A2 | 5/2006 |
| WO | 2006108256 A1 | 10/2006 |
| WO | 2008030969 A2 | 3/2008 |
| WO | WO 2011011389 A1 * | 1/2011 ............... C08H 1/00 |

OTHER PUBLICATIONS

Kumar, R., et al., "Adhesives and plastics based on soy protein products," Industrial Crops and Products 16 (2002) 155-172.*
Durham, D., "The United Soybean Board's Better Bean Initiative: Building United States Soybean Competitiveness from the Inside Out," AgBioForum, 2003, 6, 23-26.*
John, et al., "Properties of Reactively Blended Soy Protein and Modified Polyesters", Polymer International, 1999, vol. 48, pp. 1165-1172.
Ayse Alemdar, et al., Isolation and characterization of nanofibers from agricultural residues—Wheat straw and soy hulls, ScienceDirect, Biosource Technology 99, 2008, pp. 1664-1671.
Michael R. Kessler, et al., Biorenewable Composites Reinforced with Under-used Co-products from Ethanol Production, Year End Progress Report, 2008, pp. 1-7.

* cited by examiner

*Primary Examiner* — Liam J Heincer
*Assistant Examiner* — Nicholas Hill
(74) *Attorney, Agent, or Firm* — MacMillan, Sobanski & Todd, LLC

(57) ABSTRACT

In a method of producing a polymer composite, a polymer is provided in a liquid state such as a molten state. A plant material, such as soymeal, is provided that includes protein and carbohydrate. The plant material has a particle size less than 50 microns. A reactive protein denaturant is also provided. A dispersion of the plant material and the reactive protein denaturant is formed in a matrix of the liquid polymer. The plant material is reacted to bond with the reactive protein denaturant, and the reactive protein denaturant is reacted to bond with the polymer. The polymer is solidified to produce the polymer composite.

16 Claims, No Drawings

METHODS OF MODIFYING AGRICULTURAL CO-PRODUCTS AND PRODUCTS MADE THEREFROM

CROSS-REFERENCE TO RELATED APPLICATIONS

This application is a continuation-in-part patent application of U.S. patent application Ser. No. 13/386,150 filed Apr. 24, 2012, which is the National Stage of International Application PCT/US10/42567 filed Jul. 20, 2010, which claims the benefit of U.S. Provisional Application No. 61/226,904 filed Jul. 20, 2009, and claims the benefit of No. 61/227,998 filed Jul. 23, 2009, and claims the benefit of No. 61/245,695 filed Sep. 25, 2009, the disclosures of which are incorporated herein by reference.

BACKGROUND OF THE INVENTION

This invention relates in general to plant materials and methods, and in particular to methods of modifying agricultural co-products, and products such as polymer composites made with the modified co-products.

The high cost of petroleum-based fuels is resulting in increased production of biofuels such as biodiesel and ethanol. This is expected to result in an oversupply of agricultural co-products, which are the plant materials remaining after the plants are used to produce the biofuel. For example, the production of biodiesel uses the oil from soybeans or other plants and leaves co-products such as flakes, stems and hulls. Finding industrial applications for the co-products would improve the economics of the biofuel industry and enhance the profitability of farmers.

Oil extraction from grains generally results in co-products that contain both proteins and carbohydrates. The current practice is to isolate and purify to separate the proteins and carbohydrates from each other for later use as surfactants, rheology modifiers, fillers, etc. However, isolating proteins and carbohydrates from agricultural co-products is a very expensive process, which has hindered commercialization of the products.

The increase in oil prices has escalated the cost of petroleum-derived polymers. If the petroleum-derived polymers can be partially replaced by other materials, this substitution would save costs and reduce environmental waste associated with the polymers. Composites have been produced in which a portion of the polymer is replaced by plant-derived materials, but the existing commercial products are either based on isolated proteins or carbohydrates as fillers.

It would be desirable to provide improved methods and products using agricultural co-products and other plant materials.

SUMMARY OF THE INVENTION

This invention relates to a method of producing a polymer composite. A polymer is provided in a liquid state such as a molten state. A plant material, such as soymeal, is provided that includes protein and carbohydrate. The plant material has a particle size less than 50 microns. A reactive protein denaturant is provided. A dispersion of the plant material and the reactive protein denaturant is formed in a matrix of the liquid polymer. The plant material is reacted to bond with the reactive protein denaturant, and the reactive protein denaturant is reacted to bond with the polymer. The polymer is solidified to produce the polymer composite.

In a reactive extrusion method of producing the polymer composite, the dispersion is formed and the reactions are conducted in a single-step process in an extruder.

Polymer composites produced by the methods are also described.

Various aspects of this invention will become apparent to those skilled in the art from the following detailed description of the preferred embodiment.

DETAILED DESCRIPTION OF THE PREFERRED EMBODIMENT

The methods and products of the invention can utilize any suitable plant material that includes both protein and carbohydrate. Some nonlimiting examples of plants that could be used include soybeans, corn, wheat, sesame, cotton, coconut, groundnut, palm, sugarcane, beets, sunflower, castor, grasses and weeds.

In certain embodiments, the plant material is an agricultural co-product, which is plant material remaining after the plant has been used to produce another product. For example, the production of biodiesel uses oil extracted from soybeans or other plants. To extract oil from soybeans, the soybeans are cracked, adjusted for moisture content, rolled into flakes and solvent-extracted. The remaining flakes can be comminuted to produce soybean meal, soybean flour or soybean grit.

In certain embodiments, the particle size of the plant material is controlled. For example, the plant material may have a particle size less than 50 microns, more particularly less than 40 microns, more particularly less than 30 microns, and most particularly less than 20 microns. It was surprisingly found that when the composites are formed from plant material having a smaller particle size, the resulting final product has less odor and less residual color (e.g., browning). By "particle size" is meant the largest diameter of a particle. The particle size can be measured by any suitable method; for example, by U.S.A. Standard Sieves ASTM Specification E-11, other types of sieves or screens, laser diffraction, dynamic light scattering, or image analysis (dynamic or static). The particle size can be controlled by any suitable process; for example, by increased milling of the plant material.

In certain embodiments, the protein content of the plant material is controlled. For example, the plant material may have a protein content less than 45%, more particularly less than 40%, and most particularly less than 35%. It was surprisingly found that when the composites are formed from plant material having a lower protein content, the resulting final product has less odor and less residual color. The protein content of the plant material can be measured by any suitable method; for example, by the standard AOAC method.

This invention provides methods of modifying agricultural co-products and other plant materials to make them more suitable for use in producing commercial products and/or for use in other industrial applications. In one embodiment, a method of modifying a plant material comprises the steps of: providing a plant material that includes protein and carbohydrate; providing a reactive protein denaturant that is capable of chemically bonding to the protein and promoting unfolding of the protein; and reacting to chemically bond the reactive protein denaturant to the plant material under conditions sufficient to unfold the protein.

The reactive protein denaturant can be any material that is capable of chemically bonding to the protein and promoting unfolding of the protein. In certain embodiments, the reactive protein denaturant is a non-polymeric material. For example, in some particular embodiments, the reactive protein denaturant is a material selected from ethylenically unsaturated anhydrides, ethylenically unsaturated carboxylic acids, ethylenically unsaturated carboxylic acid esters, ethylenically unsaturated amines and imines, ethylenically unsaturated diketonates, derivatives of these materials, and mixtures of these materials. Some examples of denaturants include maleic anhydride, acetoacetoxyethyl methacrylate, methacrylic acid, methyl methacrylate, butyl acrylate, and soy acrylate.

In certain embodiments, the reactive protein denaturant is the product of the reaction between an unsaturated anhydride and an amino alcohol functionality. Some nonlimiting examples of such denaturants are described in Sample B and Sample C of Example 9 hereinbelow. Examples of an unsaturated anhydride include but are not limited to maleic anhydride, 1-cyclopentene-1,2-dicarboxylic anhydride, 4,7-dihydro-2-benzofuran-1,3-dione, 2,3-dichloromaleic anhydride, 5-norbornene-2,3-dicarboxylic anhydride, itaconic anhydride, citraconic anhydride, and dodecenylsuccinic anhydride. The amino alkyl functionality can be, for example, N-(2-hydroxyethyl) iminodiacetic acid, bis(2-hydroxyethyl) amino acetic acid, N-ethyldiethanolamine, 4-(2-hydroxyethyl)morpholine, 4-(2-hydroxypropyl) morpholine, N-allyl-2,2'-iminodiethanol, triethanolamine, 3-morpholino-1,2-propanediol, 2,6-dimethyl-4-morpholineethanol, and N,N'-diethanolamine.

The chemical bonding of the reactive protein denaturant to the protein can be covalent or ionic bonding, and the particular type of bonding will depend on the types of protein and denaturant. For example, soybean protein contains about twenty different amino acids, including those that contain reactive functional groups such as amino, carboxyl and hydroxyl groups. When the denaturant is maleic anhydride, one of the carbonyl groups of the maleic anhydride can react with an amino group of the protein, with the carbonyl carbon covalently bonding to the amino nitrogen. The bonded maleic anhydride extends from the protein with a second carbonyl group on the outer end that is capable of further reaction as discussed below. Similarly, when the denaturant is acetoacetoxyethyl methacrylate, one of the carbonyl groups of the acetoacetoxyethyl methacrylate can react with an amino group of the protein, with the carbonyl carbon covalently bonding to the amino nitrogen. The bonded acetoacetoxyethyl methacrylate extends from the protein with a second carbonyl group on the outer end that is capable of further reaction.

The chemical bonding of the reactive protein denaturant to the protein promotes unfolding of the protein. By way of background, a protein is a long strand of amino acids linked together in a specific sequence. In its usual state, the protein is folded or curled up on itself so that hydrophobic portions of the protein are on the inside of the structure and hydrophilic portions are on the outside. The bonding of the denaturant to the protein, either alone or in combination with other factors, causes the protein to change from its folded structure to a substantially unfolded structure.

In certain embodiments, the denaturant is hydrophilic and it bonds to a hydrophobic portion of the protein structure, which promotes the unfolding of the protein. Also, in certain embodiments, the denaturant is acidic in character, which promotes the unfolding of the protein. Other factors that could contribute to the unfolding of the protein include, for example, heating, adjusting the pH, applying other chemicals, and the use of certain solvents.

The reaction of the denaturant with the protein can be carried out under any suitable conditions. In some embodiments, the reaction is carried out in solution, and in other embodiments it is carried out in emulsion.

In other embodiments, the reactive protein denaturant is a polymer that is functionalized with a reactive moiety. For example, in certain embodiments, the polymer is a graft polymer including the reactive moiety. The reactive moiety can be any that is capable of chemically bonding to the protein and promoting unfolding of the protein. For example, the reactive moiety can be any of those materials described above.

The polymer can be any suitable polymer for including the reactive moiety in reaction with the protein. It may be a thermoplastic or a thermoset polymer, and it may be a homopolymer or a copolymer, depending on the particular application. For example, in certain embodiments, the polymer is selected from polyolefins such as polyethylenes, polypropylenes, polybutadienes, polybutenes or polybutylenes. In certain other embodiment, the polymer is selected from polystyrenes or polyvinyl ethers. Other examples of polymers that may be used include polyesters, polyurethanes, polyamides, polyimides, polysulfones, polyacrylates, and halogenated polymers.

In another embodiment, the invention provides a method of producing a polymer composite. The method includes providing a polymer in a liquid state. For example, the polymer can be a hot molten thermoplastic polymer, or it can be a thermoset polymer which is in a liquid state before curing. The method also includes providing a plant material that includes protein and carbohydrate, and providing a reactive protein denaturant that is capable of chemically bonding to the protein and promoting unfolding of the protein.

In a single-step process, a dispersion is formed of the plant material and the reactive protein denaturant in a matrix of the liquid polymer, and the reactive protein denaturant and the plant material are reacted to chemically bond them together, using process conditions sufficient to unfold the protein. The reaction of the reactive protein denaturant with the plant material is included as part of the same process as the forming of the dispersion of plant material and denaturant in the polymer, rather than a multiple step process in which the reaction occurs in an initial step and then the dispersion with the polymer is formed in a subsequent step. The polymer can either be in a liquid state before the single-step process, or it can be converted from a solid to a liquid state during the process.

Lastly, the polymer is solidified to produce a polymer composite. For example, if the polymer in a liquid state is a hot molten thermoplastic polymer, it can be solidified by cooling it. If the polymer in a liquid state is a thermoset polymer, it can be solidified by curing it.

In certain embodiments, the reactive protein denaturant bonded to the plant material includes a reactive functional group that reacts with the polymer. For example, the denaturant may cross-link with the polymer to produce a more stable composite. As discussed above, denaturants such as maleic anhydride and acetoacetoxyethyl methacrylate include carbonyl groups that can react with the polymer or with other materials in the composite. Other denaturants may have other reactive functional groups.

The polymer used in the composite can be any type of thermoplastic or thermoset polymer suitable for producing a composite. Such polymers are well-known in the art. For example, the polymer can be a thermoplastic polymer that is melt-processable between about 130° C. and about 300° C. Some examples of polymers that may be used include polypropylenes, polyethylenes, other polyolefins, polystyrenes, polyalkyl acrylates, chloropolymers such as polyvinyl chlorides, polyesters, polyurethanes, polysulfones, polyamides, polycarbonates, polylactic acids, polyacrylamides, polyetheretherketones, and acrylonitrile butadiene styrenes.

Many other types of polymers may also be used; for example, polysuccinates, polyacrylates, and polymers with poly(lactic acid). The polymer does not have to be a high molecular weight polymer.

As described above, in certain embodiments the reactive protein denaturant is a non-polymeric material, and in other embodiments the denaturant includes a functional material grafted to a polymer. In some embodiments, the polymer portion of the denaturant is the same as the polymer which forms the matrix of the composite, and in other embodiments the polymers are different.

In certain embodiments, the reactive protein denaturant is a polymeric material, and the denaturant bonded to the plant material provides a thermal barrier that protects the plant material from thermal damage when it is contacted with the hot molten polymer during production of the composite. It is believed that the polymeric portion of the denaturant may absorb heat and/or shield the plant material from contact with the hot molten polymer.

Also, in certain embodiments, during the production of the composite using a hot molten thermoplastic polymer, the heat from the molten polymer promotes the unfolding of the protein. This may provide access to the reactive functional groups of the protein, which assists the reactive protein denaturant in reacting with and bonding to the protein.

The plant material can be included in the composite in any suitable amount. For example, in some embodiments the amount of the plant material present in the composite is within a range of from about 10 wt % to about 40 wt % depending on the application.

The method of producing a polymer composite can use an suitable equipment, which is well-known in the art. Also, any suitable processing conditions can be used.

In another embodiment, the invention provides a reactive extrusion method of producing a polymer composite. The method can be similar to the single-step process described above, but more particularly the process takes place in an extruder. The reactive extrusion method includes providing a polymer in a liquid state, providing a plant material that includes protein and carbohydrate, and providing a reactive protein denaturant that is capable of chemically bonding to the protein and promoting unfolding of the protein. In an extruder, a dispersion is formed of the plant material and the reactive protein denaturant in a matrix of the liquid polymer. The reactive protein denaturant is reacted with the plant material to chemically bond them together. The process conditions are sufficient to unfold the protein. The dispersion is extruded into a desired shape. Then the polymer is solidified to produce the polymer composite.

Any suitable extrusion equipment and process conditions can be used to produce the polymer composite. Any type of suitable extrusion methods can be used, including direct extrusion, indirect extrusion or hydrostatic extrusion. Most common is direct extrusion with a twin screw or single screw extruder.

In certain embodiments, the temperature of the process in the extruder is controlled. For example, the process may be conducted at a temperature not higher than 360° F., more particularly not higher than 350° F., more particularly not higher than 340° F., more particularly not higher than 330° F., and most particularly not higher than 320° F. Controlling the temperature during the process can result in less odor and less residual color in the product composite.

In certain embodiments, the denaturant used in the process is nonpolymeric (e.g., maleic anhydride). For example, in the extruder in situ process, the process is conducted so that the denaturant preferentially reacts with the molten polymer (e.g., polypropylene). For example, a radical initiator can be used to get them to react together. At the same time, the denaturant reacts with the protein; this results in unfolding the entanglement with carbohydrates of the protein, and reacting of the denaturant with the amine groups of the protein.

In certain embodiments, a method of producing a polymer composite includes the following. A plant material as described above, for example soymeal, and a reactive protein denaturant are dispersed in a molten polymer. The soymeal is reacted with the denaturant, and the denaturant is reacted with the polymer. In certain embodiments, this is a single-step process conducted in an extruder, by a reactive extrusion method. For example, the process can include a single-step condensation reaction. This method can produce a product that has long polymeric arms attached to the denaturant and soymeal and practically no short ones such as those which would be produced by reaction with prepolymers. The product made by this method can be predominantly aliphatic hydrocarbon.

In another embodiment, the invention provides a moldable polymer composite. The composite comprises: a thermoplastic polymer; a plant material dispersed in a matrix of the polymer, the plant material including carbohydrate and protein that is unfolded; and a reactive protein denaturant chemically bonded to the protein and having promoted unfolding of the protein.

The composite can be molded, to produce a molded article, by any suitable molding process. Such processes and suitable equipment are well-known in the art. For example, the composite can be injection molded, injection blow molded or compression molded into an article.

In certain embodiments, a molded composite product according to the invention has similar mechanical properties compared to a fully petroleum derived polymer product. For example, in certain embodiments, the composite product has similar impact strength compared to pure polypropylene. Also, in certain embodiments, the composite product does not absorb water on exposure to high humidity.

Polymer composite products may be susceptible to degradation by bacteria. In certain embodiments, the physical properties of a molded composite product according to the invention are not substantially affected by bacterial degradation. In a particular embodiment, the tensile strength of the composite product is not substantially affected. Example 10 hereinbelow presents a study showing no effect on the tensile strength of the composite by bacterial degradation.

The modified plant materials can be used in many industrial applications, such as making composites with petroleum based polymer, as functional fillers for thermoset resins, as additives in paints and coatings, and in superabsorbent polymers. It is expected that the materials can find uses in industries such as transportation, packaging, building and construction, electrical and electronic, furniture and furnishings, consumer and institutional products, industrial/machinery, adhesives, inks and coatings.

The modified plant material can be used as an anti-caking additive. It can function as a crystal growth inhibitor.

A polymer composite produced with the modified plant material can be used to construct a bioreactor for a biorefinery, for example a tubular bioreactor. Because the physical properties of the composite are not substantially affected by bacterial degradation, the composite can be useful as a reactor for the growth of bacteria and other microorganisms.

EXAMPLES

Example 1

Soymeal in Polyethylene

Step 1: Process Soymeal

Grind soymeal (ADM, HI-PRO) using a hammer mill (MIKRO BANTAM from Hoskawa Micron Powder Systems) through a 0.010 HB slot screen (254 microns). Sift (Gilson SS-8R Sieve Shaker) the ground product using 300 μm, 106 μm, 75 μm and 45 μm sieves (USA Standard Testing Sieve; ASTME-11 Spec). For this example, used only product obtained between 106 μm and 75 μm particle size.

Step 2: Protonate SURLYN

Charge 100 g SURLYN 8940 (ethylene/methacrylic acid copolymer) and 1 L 1.5 M sulfuric acid into a 1 L reaction kettle fitted with an overhead stirrer (IKA-Werke) (PTFE blade), thermocouple, argon inlet and argon outlet. Maintain ambient temperature under argon flow for 24 hours.

Rinse product with de-ionized water until washings are pH neutral. Dry in Shel Lab 1410 vacuum oven at 90° C. overnight.

Step 3: Modify Soymeal with SURLYN 8940 (Master Batch)

In a Brabender Type Six Mixer with fitted roller blades, perform the following:

| Time | Temp | Action |
| --- | --- | --- |
| 0.00 | 170° F. | Add 5 g SURLYN 8940 |
| 0.15 | 170° F. | Increase SP to 185° F. |
| 0.25 | 185° F. | Increase SP to 200° F. |
| 0.30 | 200° F. | Add 5 g SURLYN 8940 |
| 0.45 | 205° F. | Add 10 g soymeal |
| 1.00 | 215° F. | Increase SP to 235° F. |
| 1.10 | 235° F. | Add 5 g SURLYN 8940 |
| 1.20 | 251° F. | Start adding remaining 35 g soymeal |
| 1.25 | 251° F. | Decrease SP to 215° F. |
| 1.40 | 240° F. | Remove mix from pot |

This master batch forms a solid mass. Hammer the mass with a mortar and pestle into pieces smaller than 0.2 inch in diameter.

Step 4: Soymeal/SURLYN Co-extrusion with Polyethylene

Step 4a: Formulation

The following formulations are prepared using both the master batch formulation (from Step 3) and direct addition of 106-75 μm soymeal. The SURLYN 8940 is the protonated material used in Step 3. The polyethylene (PE) is AT 280 from AT Plastics.

| Formulations | Actual MB (3:1) (grams) | Actual Neat Soymeal (grams) | Actual PE (grams) | Actual SURLYN 8940 (grams) |
| --- | --- | --- | --- | --- |
| Control-1 | | | 20 | |
| Control-2 | | | 13.9 | 6 |
| Control-3A | | 4.5 | 14 | 1.51 |
| Control-3B | | 7.5 | 10.01 | 2.5 |
| Control-3C | | 10.5 | 5.99 | 3.49 |
| Experimental 1 | 6 | | 14.0 | |
| Experimental 2 | 10 | | 10.0 | |
| Experimental 3 | 14 | | 6.0 | |

Step 4B: Sample Prep

The formulations are dried in a Shel Lab 1410 vacuum oven with Edwards pump set to 140° F. to 160° F. and maximum vacuum (35 mm Hg) overnight before extruding.

Step 4C: Extrusion

For each of these 20 grams formulations above, the materials are manually inserted into a twin screw mini extruder (Thermo Haake MINILAB) at a temperature of 240° F. with screws rotating at 50-60 RPM. The formula is fed into the screws, manually packing with a brass rod. Cut the extruded strand into pieces smaller than 2 inches in length.

Step 5: Compression Molding of PE Composite Material (20 Grams Batches)

Step 5A: Setup

With a Phi press set both bottom and top platens to a temperature of 250° F. Soak two 0.5 inch aluminum cover plates until the temperature equilibrates (about 5 minutes). The aluminum plates are covered in KAPTON polyimide film (DuPont).

Step 5B: Melting Resin

After bringing the plates to temperature, the resin is placed on the center of the bottom platen. The plates are separated with a brass shim. Close the press in order to bring the top and bottom plates in contact with the heated press platens. Soak the resin at temperature in the press for 3 min (timed with a stopwatch). Periodically adjust the plates to maintain contact with the platens.

Step 5C: Pressing

After the 3 min, the pressure is increased to 15 tonnes for 30 sec (timed with a stopwatch).

Step 5D: Cooling

Finally, the plates are removed and put into a water cooled cold press (Wabash Hydraulic Press model 30-1221) for at least 3 minutes until cool. The result is an approximately 6-inch diameter film, at about 5 mils in thickness.

Step 6: Tensile Testing of Composite Films

Samples are cut into 0.5 inch strips and tested for tensile properties using a 5564 model Instron universal test machine, equipped with Merlin software. The parameters are as follows:

Load cell: 224.8 lb
Sample width: 0.5 in
Sample gauge length: 1.0 in
Sample thickness: average of 3 measurements in test area and manually entered
Test Rate: 0.5 in/min
Data interval: 100 ms The following tensile results were obtained for the PE films:

| | | Thickness (in) | Extension at Break (in) | Max. Load (lbf) | Strain at Max (%) | Stress at Max (psi) | Extension at Max (in) | Youngs Modulus (psi) |
| --- | --- | --- | --- | --- | --- | --- | --- | --- |
| C1 | Ave | 0.0050 | 1.50 | 2.72 | 89.55 | 1103.73 | 0.90 | 14308.62 |
| | Std | 0.0003 | 0.27 | 0.13 | 20.06 | 89.43 | 0.20 | 2132.50 |

|     |     | Thickness (in) | Extension at Break (in) | Max. Load (lbf) | Strain at Max (%) | Stress at Max (psi) | Extension at Max (in) | Youngs Modulus (psi) |
| --- | --- | --- | --- | --- | --- | --- | --- | --- |
| C2  | Ave | 0.0060 | 0.83 | 3.81 | 82.01 | 1276.19 | 0.82 | 18496.60 |
|     | Std | 0.0002 | 0.15 | 0.09 | 14.79 | 41.27 | 0.15 | 1186.46 |
| C3A | Ave | 0.0070 | 0.11 | 2.76 | 8.93 | 800.67 | 0.19 | 19843.16 |
|     | Std | 0.0006 | 0.02 | 0.33 | 1.73 | 68.23 | 0.02 | 660.08 |
| C3B | Ave | 0.0080 | 0.01 | 3.21 | 6.10 | 856.68 | 0.06 | 26872.88 |
|     | Std | 0.0002 | 0.02 | 0.36 | 1.58 | 100.30 | 0.02 | 2532.64 |
| C3C | Ave | 0.0070 | 0.05 | 3.41 | 4.56 | 936.14 | 0.05 | 37409.54 |
|     | Std | 0.0004 | 0.01 | 0.34 | 0.95 | 113.99 | 0.01 | 4379.72 |
| E1  | Ave | 0.0060 | 0.19 | 3.16 | 15.12 | 1102.50 | 0.15 | 22618.12 |
|     | Std | 0.0003 | 0.04 | 0.34 | 2.77 | 87.97 | 0.03 | 1494.51 |
| E2  | Ave | 0.0060 | 0.09 | 3.50 | 8.24 | 1173.14 | 0.08 | 34304.86 |
|     | Std | 0.0008 | 0.02 | 0.42 | 1.64 | 90.45 | 0.02 | 4808.47 |
| E3  | Ave | 0.0070 | 0.06 | 4.31 | 5.90 | 1314.63 | 0.06 | 47128.60 |
|     | Std | 0.0003 | 0.01 | 0.25 | 1.01 | 82.56 | 0.01 | 5785.89 |

Example 2

Soymeal in Polypropylene

Step 1: Process Soymeal

Grind soymeal (ADM, HI-PRO) using a hammer mill (MIKRO BANTAM from Hoskawa Micron Powder Systems) through a 0.010 HB slot screen (254 microns). Sift (Gilson SS-8R Sieve Shaker) the ground product using 300 μm, 106 μm, 75 μm and 45 μm sieves (USA Standard Testing Sieve; ASTME-11 Spec). For this example, used only product obtained between 106 μm and 75 μm particle size.

Step 2: Modify Soymeal with Polypropylene-Graft-Maleic Anhydride (Master Batch)

In a Brabender Type Six Mixer with fitted roller blades, perform the following:

| Time | Temp | Action |
| --- | --- | --- |
| 0.00 | 193° F. | Add 10 g PP |
| 0.15 | 193° F. | Add 10 g soymeal |
| 0.20 | 193° F. | Add 15 g soymeal |
| 0.35 | 198° F. | Increase SP to 210° F. |
| 0.40 | 206° F. | Add 5 g soymeal |
| 0.45 | 224° F. | Increase SP to 235° F. |
| 0.55 | 235° F. | Increase SP to 245° F. |
| 1.05 | 245° F. | Increase SP to 265° F. |
| 1.35 | 265° F. | Remove material from pot |

Step 3: Soymeal/SURLYN Co-extrusion with Polypropylene (20 g Batches)

Step 3A: Formulation

The following formulations are prepared using both the master batch formulation (from Step 2 above) and direct addition of 106-75 μm soymeal. The polypropylene-graft-maleic anhydride is from Sigma-Aldrich. The polypropylene is from Total Petrochemicals (melt index of 35 g/10 min).

| Formulations | Actual MB (3:1) (grams) | Actual Neat Soymeal (grams) | Actual PE (grams) | Actual SURLYN 8940 (grams) |
| --- | --- | --- | --- | --- |
| PP_Control-1 |  |  | 20 |  |
| PP_Control-2 |  |  | 14 | 6 |
| PP_Control-3α |  | 2 | 17.3 | 0.74 |
| PP_Control-3β |  | 4.49 | 14 | 1.56 |
| PP_Control-3γ |  | 7.5 | 9.99 | 2.6 |
| PP_Experimental | 2.72 |  | 17.3 |  |
| PP_Experimental | 6.03 |  | 14.05 |  |
| PP_Experimental | 10.02 |  | 10 |  |
| PP_Control-3δ |  | 2 | 17.7 | 0.31 |
| PP_Control-3ε |  | 2 | 17.9 | 0.2 |
| PP_Control-3ζ |  | 2.05 | 18 |  |

Step 3B: Sample Preparation

The formulations are dried in a Shel Lab 1410 vacuum oven with Edwards pump set to 130° F. to 140° F. and maximum vacuum (35 mm Hg) overnight before extruding.

Step 3C: Extrusion

Manually insert 20 grams of PP formulation into a twin screw mini extruder (Thermo Haake MINILAB) at a temperature of 320° F. with screws rotating at 60-70 RPM. The extruded strand is cut into pieces smaller than 2 inches in length.

Step 4: Compression Molding of PP Composite Material (20 g Batches)

Step 4A: Setup

With a Phi press set both bottom and top platens to a temperature of 325° F. Soak two 0.5 inch aluminum cover plates until the temperature equilibrates (about 5 minutes). The aluminum plates are covered in KAPTON polyimide film (DuPont).

Step 4B: Melting Resin

After bringing the plates to temperature, 2 grams of resin are placed on the center of the bottom platen. The plates are separated with a brass shim. Close the press in order to bring the top and bottom plates in contact with the heated press platens. Soak the resin at the set temperature for 2 min (timed with a stopwatch). Periodically adjust the plates to maintain contact with the hot platens.

Step 4C: Pressing

After the 3 min, the pressure is increased to 15 tonnes for 30 sec (timed with a stopwatch).

Step 4D: Cooling

Finally, the plates are removed and put into a water cooled cold press (Wabash Hydraulic Press model 30-1221) for at least 3 minutes until cool. The result is an approximately 6-inch diameter film, at about 5 mils in thickness.

Step 5: Tensile Testing of PP Composite Films (20 g Batches)

Samples are cut into 0.5 inch strips and tested for tensile properties using a 5564 model Instron universal test machine, equipped with Merlin software. The parameters are the same as in Example 1.

The following tensile results were obtained for the PE films:

|  |  | Thickness (in) | Extension at Break (in) | Max. Load (lbf) | Strain at Max (%) | Stress at Max (psi) | Extension at Max (in) | Youngs Modulus (psi) |
|---|---|---|---|---|---|---|---|---|
| PP_C1 | Ave | 0.0060 | 3.30 | 11.13 | 14.41 | 3948.47 | 0.14 | 134868.00 |
|  | Std | 0.0001 | 2.81 | 0.38 | 1.39 | 136.70 | 0.01 | 7822.67 |
| PP_C2 | Ave | 0.0040 | 0.09 | 7.00 | 8.62 | 3948.50 | 0.09 | 155728.85 |
|  | Std | 0.0003 | 0.02 | 0.66 | 1.85 | 270.75 | 0.02 | 6001.86 |
| PP_C3α | Ave | 0.0060 | 0.11 | 10.39 | 9.23 | 3696.24 | 0.09 | 143121.09 |
|  | Std | 0.0008 | 0.04 | 0.63 | 2.06 | 389.29 | 0.02 | 15327.54 |
| PP_C3β | Ave | 0.0060 | 0.07 | 10.04 | 6.84 | 3651.54 | 0.07 | 146897.84 |
|  | Std | 0.0005 | 0.02 | 1.00 | 1.22 | 275.66 | 0.01 | 10030.79 |
| PP_C3γ | Ave | 0.0030 | 0.04 | 9.85 | 3.69 | 3169.27 | 0.04 | 170112.44 |
|  | Std | 0.0010 | 0.01 | 1.15 | 0.77 | 520.95 | 0.01 | 27915.22 |
| PP_E1 | Ave | 0.0060 | 0.12 | 10.20 | 8.62 | 3649.83 | 0.09 | 143313.72 |
|  | Std | 0.0006 | 0.03 | 0.90 | 1.50 | 420.36 | 0.01 | 16199.12 |
| PP_E2 | Ave | 0.0060 | 0.06 | 9.73 | 5.93 | 3294.20 | 0.06 | 146169.35 |
|  | Std | 0.0008 | 0.01 | 1.01 | 1.10 | 403.68 | 0.01 | 23937.72 |
| PP_E3 | Ave | 0.0060 | 0.03 | 9.31 | 3.39 | 3071.60 | 0.03 | 169571.88 |
|  | Std | 0.0009 | 0.01 | 1.31 | 0.73 | 446.40 | 0.01 | 14468.89 |
| PP_C3δ | Ave | 0.0060 | 0.10 | 10.16 | 8.39 | 3475.02 | 0.08 | 143141.01 |
|  | Std | 0.0006 | 0.03 | 1.28 | 2.15 | 545.08 | 0.02 | 11136.30 |
| PP_C3ε | Ave | 0.0060 | 0.12 | 10.53 | 9.35 | 3603.45 | 0.09 | 144388.33 |
|  | Std | 0.0011 | 0.05 | 1.14 | 2.54 | 526.13 | 0.03 | 12914.38 |
| PP_C3ζ | Ave | 0.0050 | 0.16 | 9.05 | 9.81 | 3474.02 | 0.10 | 151729.30 |
|  | Std | 0.00 | 0.09 | 0.40 | 2.35 | 807.25 | 0.02 | 34272.77 |

Example 3

Soymeal in Polypropylene (Direct Addition) Scale-up

Step 1: Process Soymeal

Grind soymeal (ADM, HI-PRO) using a hammer mill (MIKRO BANTAM from Hoskawa Micron Powder Systems) through a 0.010 HB slot screen (254 microns). Sift (Gilson SS-8R Sieve Shaker) the ground product using 300 μm, 106 μm, 75 μm and 45 μm sieves (USA Standard Testing Sieve; ASTME-11 Spec). For experimentation, use only product obtained between 106 μm and 75 μm particle size.

Step 2: Formulation of Composite—10% Soymeal, 1.5% PP-g-MA in PP

The formulation is the same as sample PP_C3δ in Example 2, but scale batch up to 20 pounds.

Combine soymeal (907.5 g (2 lbs)) and PP-graft-MA (136.08 g (0.3 lbs)) (Aldrich), and dry materials in a Fisher Scientific ISOTEMP gravity oven at 60° C.

Perform a regression study on the powder mixture (above) and the PP resin (8028.7 g (17.7 lbs)) in two separate feeder hoppers. The feeders are turned on for 1 minute and the output is collected in a bucket and weighed. Three measurements are performed at each rate setting. The average output weights (grams/min) were obtained with the following flow rate settings.

| Feeder 1 | | | | |
|---|---|---|---|---|
| Rate Setting | | PP | | Average |
| 25 | 43.9 | 41.8 | 41.3 | 42.33 |
| 50 | 88.2 | 83.4 | 92.3 | 87.97 |
| 75 | 127.8 | 136 | 129.5 | 131.10 |
| 100 | 177.2 | 174.9 | 176.9 | 176.33 |

| Feeder 2 | | | | |
|---|---|---|---|---|
| Rate Setting | | Soy + PP-g-MA | | Average |
| 25 | 8.9 | 7.9 | 8.8 | 8.53 |
| 50 | 16.6 | 17.5 | 15.9 | 16.67 |
| 100 | 34 | 34.5 | 32.7 | 33.73 |
| 200 | 70.9 | 66.2 | 69.8 | 68.97 |
| 300 | 102.9 | 101.8 | 102.9 | 102.53 |

Using Excel, the results are plotted (not shown) to get an equation for the flow rates of each feeder. The total flow rates are calculated using the equations for each feeder. For this formulation, the total flow is 11.5% powder mixture (PP-g-MA and soymeal) and 88.5% PP resin.

| 11.5% Soy + PP-g-MA | | | | |
|---|---|---|---|---|
| Total Flowrate (g/min) | Soy + PP-g-MA | PP | Feeder 1 | Feeder 2 |
| 150 | 17 | 133 | 71 | 49 |
| 200 | 23 | 177 | 95 | 66 |
| 250 | 29 | 221 | 119 | 83 |
| 300 | 35 | 266 | 143 | 100 |
| 350 | 40 | 310 | 166 | 116 |
| 400 | 46 | 354 | 190 | 133 |

Step 3: Extrude Material

The sample is extruded in a Berstorff 3016987 extruder, fixed with a spaghetti strand die at 200 g/min. To achieve this rate, Feeder 1 is set to 95 and feeder 2 is set to 66. Allow the extruder to warm up to the set temperatures before turning the feeders on. The extruder speed is set to 78 and the extruder voltage reads 78 volts. When the soy and resin flow, the torque (extruder amps) reads 28 to 29.5 A and the melt temperature is 316.3° F.

The extruder settings are as follows:

| Zone | W0 | B2 | B3 | B4 | B5 | B6 | B7 | B8 | H9 |
|---|---|---|---|---|---|---|---|---|---|
| Initial Values at the Beginning of the Run | | | | | | | | | |
| Current Temperature | 91 | 295 | 301 | 313 | 309 | 310 | 305 | 313 | 315 |
| Set Temperature | 85 | 295 | 300 | 310 | 310 | 310 | 310 | 310 | 315 |

-continued

| | Zone W0 | B2 | B3 | B4 | B5 | B6 | B7 | B8 | H9 |
|---|---|---|---|---|---|---|---|---|---|
| | Final Values at the End of the Run | | | | | | | | |
| Current Temperature | 92 | 301 | 290 | 305 | 304 | 305 | 303 | 304 | 312 |
| Set Temperature | 85 | 290 | 290 | 305 | 305 | 305 | 305 | 305 | 310 |

The extruded material is pulled through a 6 ft Berlyn Tap Water Bath, and the strand is pelletized with a Berlyn HV-1 pelletizer. The pellets are approximately 0.1 inch in length. The pelletized composite material is put into an oven overnight at 60° C. to dry.

Step 4: Injection Mold Extruded PP Composite Scale-up (20 lb Batch)

Dry material from Step 3 is processed by injection molding in a Cincinnati injection molder set to make 2.5 inch dog bone tensile bars and 0.125 inch plaques.

Step 5: Tensile Testing of PP Composite Dog Bones

Samples are molded into dog bone shapes 0.5×0.125×2.5 inches. They are tested for tensile properties using a 4505 model Instron universal test machine, equipped with Series 9 software. The parameters are as follows:
Load cell: 2248 lb
Sample width: 0.5 in
Sample gauge length: 2.5 in
Sample thickness: 0.125 in
Test Rate: 0.5 in/min
Data interval: 25 pts/sec
Data reduction: 0.3 min The tensile testing results are as follows:

| | | Max. Load (lbf) | Strain at Max (%) | Stress at Max (psi) | Extension at Max (in) | Youngs Modulus (psi) |
|---|---|---|---|---|---|---|
| Control | Ave | 253.20 | 12.38 | 4052.00 | 0.31 | 170920.20 |
| | Std | 3.30 | 1.66 | 53.00 | 0.04 | 15458.14 |
| Sample 1 (315° F.) | Ave | 253.70 | 8.21 | 4060.00 | 0.21 | 182170.72 |
| | Std | 5.40 | 1.18 | 87.00 | 0.03 | 18090.27 |
| Sample 2 (335° F.) | Ave | 254.30 | 8.30 | 4069.00 | 0.21 | 183389.77 |
| | Std | 0.90 | 0.68 | 15.00 | 0.02 | 5791.26 |
| Sample 3 (355° F.) | Ave | 239.20 | 8.47 | 3827.00 | 1.21 | 163714.64 |
| | Std | 1.00 | 0.53 | 17.00 | 0.01 | 9103.55 |
| Sample 4 (380° F.) | Ave | 225.30 | 10.35 | 3605.00 | 0.26 | 158712.58 |
| | Std | 0.80 | 0.63 | 13.00 | 0.02 | 5167.30 |
| Sample 5 (420° F.) | Ave | 215.00 | 12.58 | 3440.00 | 0.31 | 151295.98 |

Example 4

Soymeal in Polystyrene (Emulsion)

Step 1: Process Soymeal

Grind soymeal (ADM, HI-PRO) using a hammer mill (MIKRO BANTAM from Hoskawa Micron Powder Systems) through a 0.010 HB slot screen (254 microns). Sift (Gilson SS-8R Sieve Shaker) the ground product using 300 μm, 106 μm, 75 μm and 45 μm sieves (USA Standard Testing Sieve; ASTME-11 Spec). For experimentation, use only product obtained between 106 μm and 75 μm particle size.

Step 2: Pre-emulsion

In a 400 mL beaker (Beaker 1), combine 100 mL deionized water and 10.01 g sodium dodecylsulfate. Place the beaker in a crystallization dish and fill the dish with ice. Stir the beaker contents with an overhead stirrer fitted with a dispersion blade.

In a separate 400 mL beaker (Beaker 2), combine 2.62 g AIBN and 140.7 g styrene monomer. Cover with a watch glass and place on a magnetic stir plate until the AIBN has been dissolved completely. Transfer the solution to a 250 mL separatory funnel.

Add the contents of the separatory funnel dropwise to Beaker 1 while still under dispersion. Using a powder addition funnel, slowly add 10.87 g (106-75 μm) soymeal to Beaker 1. During addition of soymeal, sonicate the contents of Beaker 1 three times at 54 watts for 1 minute each time (Misonix SONICATOR 3000). Transfer contents of Beaker 1 to a 250 mL separatory funnel.

Step 3: Polymerization

In a 500 mL reaction kettle fitted with an overhead stirrer, thermocouple, and argon inlet and outlet, heat 100 mL deionized water to 60° C. under stirring and argon flow. Remove argon outlet port and insert neck of separatory funnel into kettle. Add contents of separatory funnel to the kettle dropwise. Once all material has been charged, maintain kettle at 60° C. for 4 hours. Allow product to cool under stirring.

Transfer product to glass bottle, add 0.20 g biocide, and stir contents.

Example 5

Modification of Soymeal with AAEM (Solution)

Step 1: Process Soymeal

Grind soymeal (ADM, HI-PRO) using a hammer mill (MIKRO BANTAM from Hoskawa Micron Powder Systems) through a 0.010 HB slot screen (254 microns). Sift (Gilson SS-8R Sieve Shaker) the ground product using 300 μm, 106 μm, 75 μm and 45 μm sieves (USA Standard Testing Sieve; ASTME-11 Spec). For experimentation, use only product obtained between 106 μm and 75 μm particle size.

Step 2: Modification with AAEM

In a 1 L reaction kettle fitted with an overhead stirrer, an argon inlet, a thermocouple, and a condenser (with argon outlet), charge the following: 80.0 g (106-75 μm) soymeal, 720.0 g DMAc, 8.0 g AAEM, and 0.1 g TEA. Start argon and condenser flow and turn on overhead stirrer. React at 80° C. for 12 hours. Allow product to stir while cooling to room temperature.

Step 3: Product Isolation

Transfer kettle contents to a 1 L centrifuge bottle and centrifuge (IEC DPR-6000 Centrifuge) for 15 minutes at 3,000 RPM. Decant the supernatant and replace with 500 g distilled water. Repeat previous step three additional times. Dry the resulting solid in a Shel Lab 1410 vacuum oven at 70° C. overnight.

Remove product from oven and grind on a Glen Mills MICRO HAMMER CUTTER MILL IV through a 0.2 mm screen. Collect powder in a glass bottle.

Example 6

Modification of Soymeal with AAEM (Emulsion)

Step 1: Process Soymeal

Grind soymeal (ADM, HI-PRO) using a hammer mill (MIKRO BANTAM from Hoskawa Micron Powder Systems) through a 0.010 HB slot screen (254 microns). Sift (Gilson SS-8R Sieve Shaker) the ground product using 300 µm, 106 µm, 75 µm and 45 µm sieves (USA Standard Testing Sieve; ASTME-11 Spec). For experimentation, use only product obtained between 106 µm and 75 µm particle size.

Step 2: Pre-emulsion

In a 400 mL beaker (Beaker 1), combine 100 mL deionized water and 9.99 g sodium dodecylsulfate. Place the beaker in a crystallization dish and fill the dish with ice. Stir the beaker contents with an overhead stirrer fitted with a dispersion blade.

In a separate 400 mL beaker (Beaker 2), combine 2.60 g AIBN, 100 mL MMA, and 40.04 g AAEM. Cover with a watch glass and place on a magnetic stir plate until the AIBN has been dissolved completely. Transfer the solution to a 250 mL separatory funnel.

Add the contents of the separatory funnel dropwise to Beaker 1 while still under dispersion. Using a powder addition funnel, slowly add 10.47 g (106-75 µm) soymeal to Beaker 1. During addition of soymeal, sonicate the contents of Beaker 1 three times at 54 watts for 1 minute each time (Misonix SONICATOR 3000). Transfer contents of Beaker 1 to a 250 mL separatory funnel.

Step 3: Polymerization

In a 500 mL reaction kettle fitted with an overhead stirrer, thermocouple, and argon inlet and outlet, heat 100 mL deionized water to 60° C. under stirring and argon flow. Remove argon outlet port and insert neck of separatory funnel into kettle. Add contents of separatory funnel to the kettle dropwise. Once all material has been charged, maintain kettle at 60° C. for 4 hours. Allow product to cool under stirring.

Transfer product to glass bottle, add 0.20 g biocide, and stir contents.

Example 7

Modification of Soymeal with MMA, BA and Soy Acrylate

Step 1: Process Soymeal

Grind soymeal (ADM, HI-PRO) using a hammer mill (MIKRO BANTAM from Hoskawa Micron Powder Systems) through a 0.010 HB slot screen (254 microns). Sift (Gilson SS-8R Sieve Shaker) the ground product using 300 µm, 106 µm, 75 µm and 45 µm sieves (USA Standard Testing Sieve; ASTME-11 Spec). For experimentation, use only product obtained between 106 µm and 75 µm particle size.

Step 2: Pre-emulsion

In a 400 mL beaker (Beaker 1), combine 100 mL deionized water and 10.03 g sodium dodecylsulfate. Place the beaker in a crystallization dish and fill the dish with ice. Stir the beaker contents with an overhead stirrer fitted with a dispersion blade.

In a separate 400 mL beaker (Beaker 2), combine 2.62 g AIBN, 100.01 g MMA, 29.98 g BA and 10.04 g soy acrylate. Cover with a watch glass and place on a magnetic stir plate until the AIBN has been dissolved completely. Transfer the solution to a 250 mL separatory funnel.

Add the contents of the separatory funnel dropwise to Beaker 1 while still under dispersion. Using a powder addition funnel, slowly add 10.86 g (106-75 µm) soymeal to Beaker 1. During addition of soymeal, sonicate the contents of Beaker 1 three times at 54 watts for 1 minute each time (Misonix SONICATOR 3000). Transfer contents of Beaker 1 to a 250 mL separatory funnel.

Step 3: Polymerization

In a 500 mL reaction kettle fitted with an overhead stirrer, thermocouple, and argon inlet and outlet, heat 100 mL deionized water to 60° C. under stirring and argon flow. Remove argon outlet port and insert neck of separatory funnel into kettle. Add contents of separatory funnel to the kettle dropwise. Once all material has been charged, maintain kettle at 60° C. for 4 hours. Allow product to cool under stirring.

Transfer product to glass bottle, add 0.20 g biocide, and stir contents.

Example 8

Modification of Soymeal with MMA, BA and Soy Acrylate

Step 1: Process Soymeal

Grind soymeal (ADM, HI-PRO) using a hammer mill (MIKRO BANTAM from Hoskawa Micron Powder Systems) through a 0.010 HB slot screen (254 microns). Sift (Gilson SS-8R Sieve Shaker) the ground product using 300 µm, 106 µm, 75 µm and 45 µm sieves (USA Standard Testing Sieve; ASTME-11 Spec). For experimentation, use only product obtained between 106 µm and 75 µm particle size.

Step 2: Pre-emulsion

In a 400 mL beaker (Beaker 1), combine 100 mL deionized water and 10.01 g sodium dodecylsulfate. Place the beaker in a crystallization dish and fill the dish with ice. Stir the beaker contents with an overhead stirrer fitted with a dispersion blade.

In a separate 400 mL beaker (Beaker 2), combine 2.61 g AIBN, 105.00 g MMA, 20.03 g BA and 14.94 g soy acrylate. Cover with a watch glass and place on a magnetic stir plate until the AIBN has been dissolved completely. Transfer the solution to a 250 mL separatory funnel.

Add the contents of the separatory funnel dropwise to Beaker 1 while still under dispersion. Using a powder addition funnel, slowly add 10.58 g (106-75 µm) soymeal to Beaker 1. During addition of soymeal, sonicate the contents of Beaker 1 three times at 54 watts for 1 minute each time (Misonix SONICATOR 3000). Transfer contents of Beaker 1 to a 250 mL separatory funnel.

Step 3: Polymerization

In a 500 mL reaction kettle fitted with an overhead stirrer, thermocouple, and argon inlet and outlet, heat 100 mL deionized water to 60° C. under stirring and argon flow. Remove argon outlet port and insert neck of separatory funnel into kettle. Add contents of separatory funnel to the kettle dropwise. Once all material has been charged, maintain kettle at 60° C. for 4 hours. Allow product to cool under stirring.

Transfer product to glass bottle, add 0.20 g biocide, and stir contents.

Example 9

Part 1: Procedure for Making Unsaturated Polyester Resin Sample A:

In a 1000 mL reaction kettle fitted with a thermocouple, overhead stirrer, Dean Stark trap and inter gas inlet, charged Cargill X-0210 (bio-based polyol) (395 grams), propylene glycol (228 grams) and isophthalic acid (93 grams). The contents in the reactor were heated to 215 deg C. and cook till the acid value of the reaction mixture less than 15 mg KOH/g of sample. The reaction mixture was cooled to 110 deg C. and added maleic anhydride (235 grams) and hydroquinone (100 parts per million). The contents were heated to 210 deg C. and continued till the acid value is around 35 mg of KOH/g of sample. The product obtained is cooled. To 65 parts of the product thus obtained, 31.5 parts of styrene and 3.5 parts of acetoacetoxy ethyl methacrylate were mixed and stored.

Sample B:

In a 250 mL reaction kettle fitted with a thermocouple, overhead stirrer, Dean Stark trap and inert gas inlet, charged cis-5-Norbornene-endo-2,3-dicarboxylic anhydride (50 grams), bis(2-hydroxyethyl)amino acetic acid (104 grams), dibutyl tin oxide (0.15 grams), toluene (70 mL) and dimethyl acetamide (120 mL). The contents were heated to reflux and continued the reaction till the acid value is around 250 mg of KOH/g of sample. The solvent was removed under pressure at 60 deg C. to obtain a prepolymer. To 50 gram of this prepolymer, added 55 grams of Cargill X-0210 (bio-based polyol) and 0.007 grams of hydroquinone. The contents were heated to 210 deg C. and continued till the acid value is around 20 mg of KOH/g of sample. The product obtained is cooled. To 65 parts of the product thus obtained, 31.5 parts of styrene and 3.5 parts of acetoacetoxy ethyl methacrylate were mixed and stored.

Sample C:

In a 250 mL reaction kettle fitted with a thermocouple, overhead stirrer, Dean Stark trap and inert gas inlet, charged cis-5-Norbornene-endo-2,3-dicarboxylic anhydride (50 grams), bis(2-hydroxyethyl)amino acetic acid (104 grams), dibutyl tin oxide (0.15 grams), toluene (70 mL) and dimethyl acetamide (120 mL). The contents were heated to reflux and continued the reaction till the acid value is around 250 mg of KOH/g of sample. The solvent was removed under pressure at 60 deg C. to obtain a prepolymer. To 30 gram of this prepolymer, added 55 grams of Cargill X-0210 (bio-based polyol), 4.32 grams of maleic anhydride and 0.007 grams of hydroquinone. The contents were heated to 210 deg C. and continued till the acid value is around 20 mg of KOH/g of sample. The product obtained is cooled. To 65 parts of the product thus obtained, 31.5 parts of styrene and 3.5 parts of acetoacetoxy ethyl methacrylate were mixed and stored.

Performance of unsaturated polyester resin soybean meal composites.

Sample D:

A fiber glass composite made from sample A and soybean meal had the following properties.

| Property | Value |
| --- | --- |
| Viscosity-(Brookfield LVT #3 @30 RPM) | 880 cps |
| Non Volatile % | 69 |
| Acid Number-On solution (mg/g) | 14 |
| Specific Gravity (lbs./gallon) | 8.87 |
| SPI Gel Time (minutes) | 3.53 |
| SPI Cure (minutes) | 3.05 from Gel (Total 6.58) |
| SPI Peak Exotherm (Degrees C.) | 175 |
| Dielectric Cure Analysis-Minimum Flow Time (seconds) | 11.93 |
| Dielectric Cure Analysis-Gel Time (seconds) | 21.36 |
| Dielectric Cure Analysis-Cure Time (seconds) | 53.06 |
| Specific Gravity | 1.78 |
| Shrink (Hot Tool to Cold Part) mil./inch | 2.76 |
| Shrink (Cold Tool to Cold Part) | 1.26 |
| Paste Viscosity before Thickener | 8000 cps at 90 F. |
| Viscosity in 1 Day (millions CPS) Stored 95 F. | 3 |
| Viscosity in 4 Days (millions CPS) Stored 95 F. | 11 |
| Molded Panel at 20-25% Glass | Yes |

Example 10

Effect of Bacteria on Tensile Strength of Composite

This study demonstrated that the tensile strength of a soy-polymer composite material was not affected when incubated with two specific types of bacteria in liquid culture for four weeks. This does not mean that the composite material is not susceptible to degradation by all types of bacteria, but this does suggest that bacteria may not affect the physical properties of this material. Additional studies would be necessary to further prove that this material is not affected by bacterial degradation. These could include experiments such as exposing the strips to a consortium (mixture) of bacteria in liquid media and covering the strips with soil to allow soil microbes to act upon them.

To evaluate the effect of microbial degradation on a soy polymer composite material according to the invention, a test method was developed that initially measured the effect of microbial growth on the tensile strength of this soy-polymer material. The objective of this study was to determine the effect of bacterial growth under controlled conditions on the tensile strength of the soy polymer composite.

The approach used for this study was to incubate soy-polymer composite strips with bacteria in selected media with controls. A stock culture was obtained from the American Type Culture Collection (ATCC). *Pseudomonas putida* ATCC 17472, a common environmental soil bacterium, was selected for use on this study. This organism has the ability to survive on a minimal amount of nutrients and can degrade many types of materials. The test design used four sets of flasks described in Table 1. One flask of each condition was prepared for each anticipated time point (0, 1, 2, 3 and 4 weeks). Soy strips were surface decontaminated with alcohol using a saturated cloth while being held with sterile forceps before placing them into the flasks and incubating at 26° C.

TABLE 1

Experimental Design

| Sample ID | Medium | Organism | Soy Strips |
| --- | --- | --- | --- |
| Soy 1 | Minimal | *P. putida* | + |
| Soy 2 | Minimal | None | + |
| Soy 3 | Nutrient Broth | *P. putida* | − |
| Soy 4 | Minimal | *P. putida* | − |

Note:
Mimimal media is also referred to as Basal Inorganic Minimal Medium, Recipe B (BIMB)

After incubation with the bacteria, test strips were removed, samples surface decontaminated by wiping with alcohol, and the tensile strength of the test strips was measured by AMPE to determine if the bacterial growth was affecting the physical properties of the material.

Methods used in the conduct of the testing are described in the sections below. The methods include preparation of the test organism from the freeze-dried stock provided by ATCC, inoculation of test flasks, investigation of a contamination source, and demonstration that the bacteria were associated with the test strips and could metabolize soy meal.

Organism Preparation

The freeze-dried stock of P. putida was rehydrated according to ATCC instructions by adding nutrient broth (NB) to the lyophilized culture in the glass vial. The stock was incubated for 48 hours at 26° C. and streaked onto a nutrient agar (NA) plate for isolation to determine purity and create a working stock plate that was used for this experiment. The working stock plate containing the culture was incubated until the colonies were of a countable size. Colonies from this plate were used to inoculate nutrient broth as a starter culture for the test set up. The starter culture was incubated until turbid and then used to inoculate flasks for the experiments described in Table 1.

Sample Collection and Enumeration

Starting at zero hours, and once a week for four weeks, the soy strips were removed from the appropriate flasks, surface decontaminated with alcohol, and given to the AMPE group to measure tensile strength. Samples of the liquid from the flasks were added to NA plates to be cultured for enumeration to determine the concentration of P. putida in the flask at that time point. Serial dilutions of the culture were made using PBS and enumerated after incubating the plates until the colonies reached a distinguishable size. Plates were counted and the colony forming units per mL (cfu/mL) were calculated.

Tests to Determine Source of Contamination

Bacterial contamination was observed in all samples after the first week of incubation. Samples that were not inoculated with P. putida were also turbid and contained bacterial colonies when streaked for isolation on agar plates. Various methods were used to characterize the bacterial contaminant and determine its origin. Gram stain microscopy was performed to determine the Gram reaction, cell characteristics, and to determine if more than one type of bacteria was present. The media used to grow and manipulate the bacteria was tested for the presence of viable organisms by streaking the liquids onto nutrient agar plates and included NB, BIMB, and PBS. To confirm the contamination was not on the NA plates, some were placed into an incubator without opening them. The environment inside the biosafety cabinet was tested by placing open NA plates within the cabinet during operation. The pipette tips were tested for the presence of viable organisms by placing a tip from the box being used in a tube containing NB. The P. putida working stock plate was re-streaked on to NA plates for isolation to confirm that only P. putida was present as a pure culture. Flasks containing NB were autoclaved to demonstrate the autoclave effectively sterilized media in the flasks. A soy strip was checked for contaminating organisms by wiping the strip with alcohol and placing it into a tube with nutrient broth. All samples were incubated at 37° C. and observed for bacterial growth.

Demonstration of Bacteria Attached to Soy Strips

A test was done to determine if bacteria were associated with the surface of the soy-polymer test strip. A strip from the Soy 1 test group at week three was removed from the flask, rinsed with sterile water and then placed onto a NA plate and incubated at 37° C. until visible growth was seen.

Demonstration of P. putida Growth on Soy Meal

A test was set up to demonstrate that the P. putida could utilize soy meal to grow. Bactosoytone, an enzymatic digest of soybean meal that is an additive for bacterial media, was added to PBS or BIMB and filter sterilized. This was then split into two sterile tubes. One was inoculated with P. putida from the NA working stock culture plate using a sterile loop. The tubes were incubated at 37° C. with shaking overnight and evaluated visually for turbid growth.

Results:

After the first week of growth, contamination was observed in all samples #1-4. The bacterial concentrations (cfu/mL) for both P. putida and the contaminating organism are reported in Table 2. The pure stock streak of P. putida showed 3-5 mm cream colored, smooth, round, concave colony morphology. The alternate morphology of the contaminating bacteria was pinpoint, whitish colonies. The alternate colony morphology was observed in all samples, including the ones with no P. putida added and with BIMB, which theoretically has no carbon source for vegetative growth. Both the contaminating bacteria and the P. putida were Gram negative rods. The source of contamination was not identified.

TABLE 2

Estimated Concentration of Bacteria in Samples Flasks

Counts in CFU/mL over Time

| Sample | 0 | Week 1 | Week 2 | Week 3 | Week 4 |
| --- | --- | --- | --- | --- | --- |
| Soy 1 | 3.40E+06 | >1E+3 | 1.30E+08 | 7.20E+08 | 9.70E+07 |
| Soy 2 | Not counted | Not counted | 1.70E+06 | 1.60E+06 | 1.20E+06 |
| Soy 3 | 3.40E+06 | >1E+5 | 4.30E+06 | 1.10E+07 | 9.50E+06 |
| Soy 4 | 3.30E+06 | >1E+3 | 2.80E+07 | 1.40E+07 | 2.90E+07 |

Note:
All counts are estimates due to presence of contaminating bacteria

The sample (Soy 1) that was spiked with P. putida and contained soy strips had higher concentrations of bacteria compared to the other samples including the control flasks (Soy 2) that were not spiked with P. putida. This may indicate that the P. putida was utilizing the strips to grow. In the other cultures, Soy 3 and Soy 4, the bacterial concentration remained relatively constant. This was anticipated in Soy 4 since there was no carbon source. In Soy 3, where P. putida was inoculated into nutrient broth, some level of growth was expected.

The soy test strips were shown to have bacteria binding to the surface as demonstrated by the thick bacterial growth seen all around the test strip.

The P. putida bacteria used for this experiment were able to metabolize soy protein. The tubes containing Bactosoytone that were inoculated with the P. putida were very turbid indicating bacterial growth while the ones not inoculated remained clear.

Discussion And Conclusions

This study intended to determine the effect of P. putida bacterial growth on the tensile strength of a soy-based polymer. Following four weeks of growth, all test flasks contained high concentrations of bacterial growth, including control flasks anticipated to have no growth. The test strips did not show any change in tensile strength in any of the test conditions compared to the initial values at time zero even though bacteria were found in the un-inoculated control flask. This indicates that the tensile strength of the soy-polymer composite did not change in the presence of the two specific types of bacteria, P. putida and the contaminant bacteria, over the course of four weeks. The results do not mean that the strips are not susceptible to degradation by all types of bacteria; however P. putida was chosen because of its ability to degrade many types of complex materials and should be a good preliminary indicator that the material may not be affected by bacterial growth. Additional testing should be performed to further characterize the biodegradability of the soy-polymer composite. These tests could include incubating the test strips with a mixture of bacterial strains and assessing degradation in a matrix containing a consortium of bacteria and fungi. A mixture of bacteria may use multiple mechanisms to degrade the strips and may act synergistically to enhance the effect. Burying the test strips in soil would allow naturally occurring, but non-culturable bacteria to degrade the test strips.

Appendix A: Media Formulation

Basal Inorganic Minimal Media, Recipe B (BIMB, or Minimal Media)

$KH_2PO_4$—0.2 g/L
$K_2HPO_4$—0.8 g/L
$MgSO_4.7H_2O$—0.5 g/L
$(NH_4)_2SO_4$—1 g/L
$FeSO_4.7H_2O$—0.01 g/L
$CaSO_4$—0.03 g/L

Example 11

Maleic Anhydride Denaturant

Mix ingredients into a paste after charging into PARR autoclave reactor: hammermilled soymeal (30 grams), maleic anhydride (30 grams), and distilled water (175 grams). Close lid and pressurize to 1280 PSI. Set heater to 40 C and mix at 150 RPM. After about an hour the temperature overshot to 50 C and the pressure increased to 1475 PSI. Then after another hour, the temperature equilibrated to 40 C and the pressure decreased to 1411 PSI. The next day the reactor was cooled and the product was isolated by filtration. The product particle size is provided below:

Vol. Weighted Mean D[4,3]: 34.248 um
Surface Weighted Mean D[3,2]: 15.920 um

Example 12

Maleated Soybean Oil Denaturant

Combine the following: polypropylene (24 grams), soymeal (6 grams), maleated soybean oil (1.2 grams). These ingredients were mixed together by roll-mill overnight. The following day it was extruded in the Thermo Haake mini extruder (settings 375 F/45 RPM).

Example 13

Maleated Methyl Soyate Denaturant

Combine the following: polypropylene (24 grams), soymeal (6 grams), maleated methyl soyate (1.2 grams). These ingredients were mixed together by roll-mill overnight. The following day it was extruded in the Thermo Haake mini extruder (settings 375 F/45 RPM).

Example 14

Maleated Partially Hydrogenated Soybean Oil Denaturant

Combine the following: polypropylene (24 grams), soymeal (6 grams), maleated partially hydrogenated soybean oil (2.4 grams). These ingredients were mixed together by roll-mill overnight. The following day it was extruded in the Thermo Haake mini extruder (settings 375° F./45 RPM).

Example 15

Composites with Less Odor and Residual Color

The soybean meal used in the above four examples is Arsoy™ which has a protein content of 32% (AOAC) and a carbohydrate content of 57%. This soybean meal was compared with a soybean meal having a protein content of 49% and a carbohydrate content of 34% (hereinafter referred to as the "Control"). It was surprisingly found that when composites are formed from lower protein soymeal the resultant final product had less odor and residual color.

The different soymeal samples were inserted into sealed vials and exposed to temperatures of 250° F., 315° F., 355° F. and 400° F. The samples were submitted for GC-MS. It was noted that color change above 355° F. was more pronounced in the Control soymeal sample having a higher protein content. Headspace gas analysis of the sealed vials was conducted. Furan and pyrazine derivatives are major components in soy degradation which causes malodors (e.g., burnt meat, musty, caramel or woody odors). The Control soymeal sample having a higher protein content evolved significantly greater amounts of furan, methyl pyrazine, and dimethyl disulfide gases than the Arsoy™ soymean sample having the lower protein content.

In further experimentation, it was found that lower protein content and optimal particle size and processing temperature can control degradation of soymeal. Samples of different particle size and protein content were compounded. These were then injection molded at different temperatures. The extruded formulations were as follows: 10% Control (49 microns); 27% Control (49 microns); 10% Arsoy™ (76 microns), 27% Arsoy™ (76 microns), 10% Arsoy™ (<15 microns), 27% Arsoy™ (<15 microns), 10% Arsoy™ (<15 microns) with 3% Shulman additive, 27% Arsoy™ (<15 microns), with 3% Shulman additive, 10% soy hulls (134 microns) containing 9% protein and 86% carbohydrates.

The samples were exposed to temperatures of 315° F., 355° F. and 400° F. Color evaluation showed that the Arsoy™ produced parts with less browning compared with the Control and with hulls. The additive further reduced browning. Odor qualitative analysis showed that the Arsoy™ product had less odor than the Control product.

The invention claimed is:

1. A reactive extrusion and molding method of producing a polymer composite in the form of a solid molded article, the method comprising:
provmg a polymer in a liquid state;
providing a plant material that includes protein and carbohydrate, the plant material having a particle size less than 20 microns, and the plant material having a protein content less than 35%;
providing a reactive protein denaturant;
in a single-step extrusion process in extrusion equipment, forming a dispersion of the plant material and the reactive protein denaturant in a matrix of the liquid polymer, reacting to chemically bond the plant material to the reactive protein denaturant, and reacting to chemically bond the reactive protein denaturant to the polymer, to produce an extruded composite material, wherein the extrusion process is conducted at a temperature not higher than 360° F.;

molding the extruded composite material in molding equipment to produce a molded article having a desired shape; and solidifying the molded article to produce the polymer composite in the form of a solid molded article.

2. The method of claim 1 wherein the reactive protein denaturant bonded to the plant material includes a reactive functional group which reacts with the polymer.

3. The method of claim 1 wherein the reactive protein denaturant includes a functional material grafted to a second polymer.

4. The method of claim 1 wherein the reactive protein denaturant is a non-polymeric material.

5. The method of claim 4 wherein the reactive protein denaturant is a material selected from ethylenically unsaturated anhydrides, ethylenically unsaturated carboxylic acids, ethylenically unsaturated carboxylic acid esters, ethylenically unsaturated amines and imines, ethylenically unsaturated diketonates, and/or derivatives of these materials.

6. The method of claim 1 wherein the plant material comprises a soybean material.

7. The method of claim 6 further comprising forming the extruded composite material from the extrusion equipment into pellets, and feeding the pellets to the molding equipment for molding the extruded composite material.

8. The method of claim 6 wherein the amount of soybean material in the polymer composite is within a range of from about 10 wt% to about 40 wt%.

9. The method of claim 6 further comprising adding a radical initiator to the extrusion process to promote the reaction of the denaturant with the polymer.

10. The method of claim 6 wherein the extrusion process is conducted at a temperature not higher than 350° F.

11. The method of claim 10 wherein the extrusion process is conducted at a temperature not higher than 340° F.

12. The method of claim 11 wherein the extrusion process is conducted at a temperature not higher than 330° F.

13. The method of claim 12 wherein the extrusion process is conducted at a temperature not higher than 320° F.

14. The method of claim 10 wherein the reactive protein denaturant is a non-polymeric material.

15. The method of claim 14 wherein the reactive protein denaturant is a material selected from ethylenically unsaturated anhydrides, ethylenically unsaturated carboxylic acids, ethylenically unsaturated carboxylic acid esters, ethylenically unsaturated amines and imines, ethylenically unsaturated diketonates, and/or derivatives of these materials.

16. The method of claim 10 wherein the reactive protein denaturant includes a functional material grafted to a second polymer.

* * * * *